(No Model.) 7 Sheets—Sheet 1.
T. CARNEY.
CASH REGISTER AND INDICATOR.

No. 422,375. Patented Mar. 4, 1890.

Fig.1.

Witnesses:
Albert H. Adams.
Harry T. Jones.

Inventor:
Thomas Carney (No Model.)  7 Sheets—Sheet 3.
T. CARNEY.
CASH REGISTER AND INDICATOR.

No. 422,375.  Patented Mar. 4, 1890.

Witnesses:
Albert H. Adams.
Harry T. Jones.

Inventor.
Thomas Carney.

(No Model.) 7 Sheets—Sheet 4.

T. CARNEY.
CASH REGISTER AND INDICATOR.

No. 422,375. Patented Mar. 4, 1890.

Fig. 4.

Witnesses:
Albert H. Adams.
Harry T. Jones.

Inventor:
Thomas Carney (No Model.) 7 Sheets—Sheet 6.
T. CARNEY.
CASH REGISTER AND INDICATOR.

No. 422,375. Patented Mar. 4, 1890.

Witnesses:
Albert H. Adams.
Harry T. Jones.

Inventor:
Thomas Carney (No Model.)

T. CARNEY.
CASH REGISTER AND INDICATOR.

No. 422,375.     Patented Mar. 4, 1890.

Witnesses:
Albert H. Adams
Harry T. Jones

Inventor:
Thomas Carney

UNITED STATES PATENT OFFICE.

THOMAS CARNEY, OF CHICAGO, ILLINOIS, ASSIGNOR, BY DIRECT AND MESNE ASSIGNMENTS, TO MOSES BENSINGER, OF SAME PLACE.

CASH REGISTER AND INDICATOR.

SPECIFICATION forming part of Letters Patent No. 422,375, dated March 4, 1890.

Application filed April 8, 1889. Serial No. 306,349. (No model.)

*To all whom it may concern:*

Be it known that I, THOMAS CARNEY, residing at Chicago, in the county of Cook and State of Illinois, and a citizen of the United States, have invented certain new and useful Improvements in Cash-Registers, of which the following is a specification, reference being had to the accompanying drawings, in which—

My invention relates to that class of cash registers and indicators designed to be used by store-keepers and others for the purpose of accurately indicating and registering the several sums received and also to indicate and register the total receipts.

I have made various improvements in various parts of the machine, all of which are illustrated in the drawings and will be hereinafter fully described. Those things which I claim as new will be pointed out in the claims.

In the drawings, A represents a case in which the operating mechanism is contained. In this case there is a metal frame B, by which the principal parts of the operative mechanism are supported as usual.

Figure 1:
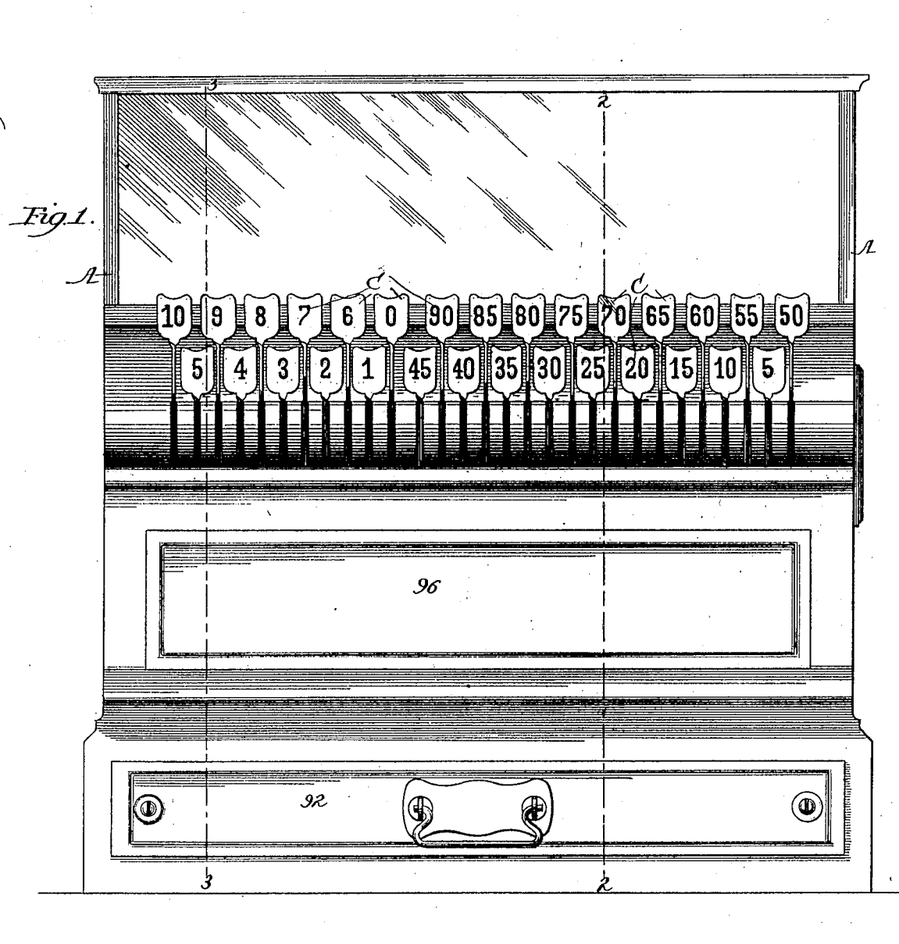
Figure 1 is a front elevation.

C represents a series of keys or levers pivotally located on a rod D. The long arm of each of these levers stands in a vertical or nearly vertical position, and they project beyond the case, which is provided with slots to receive them. The upper end of each lever is provided with a thumb-piece, on each of which one or more figures are placed, as shown in Fig. 1. As shown, one of these levers has upon it a cipher. All the keys to the right of this one are for cents, and the keys to the left of it are for dollars. I have shown no ninety-five-cent key, because it is seldom used; but such a key might be provided, or such a key might be used in place of the cipher-key shown. Under each one of these keys there is a spring E, which serves the office of returning the key after it has been used.

F (see Figs. 2 and 4) is a shaft, one end of which is supported in one end of the frame and the other end is supported in an intermediate piece G, connected with the main frame.

Figure 3:
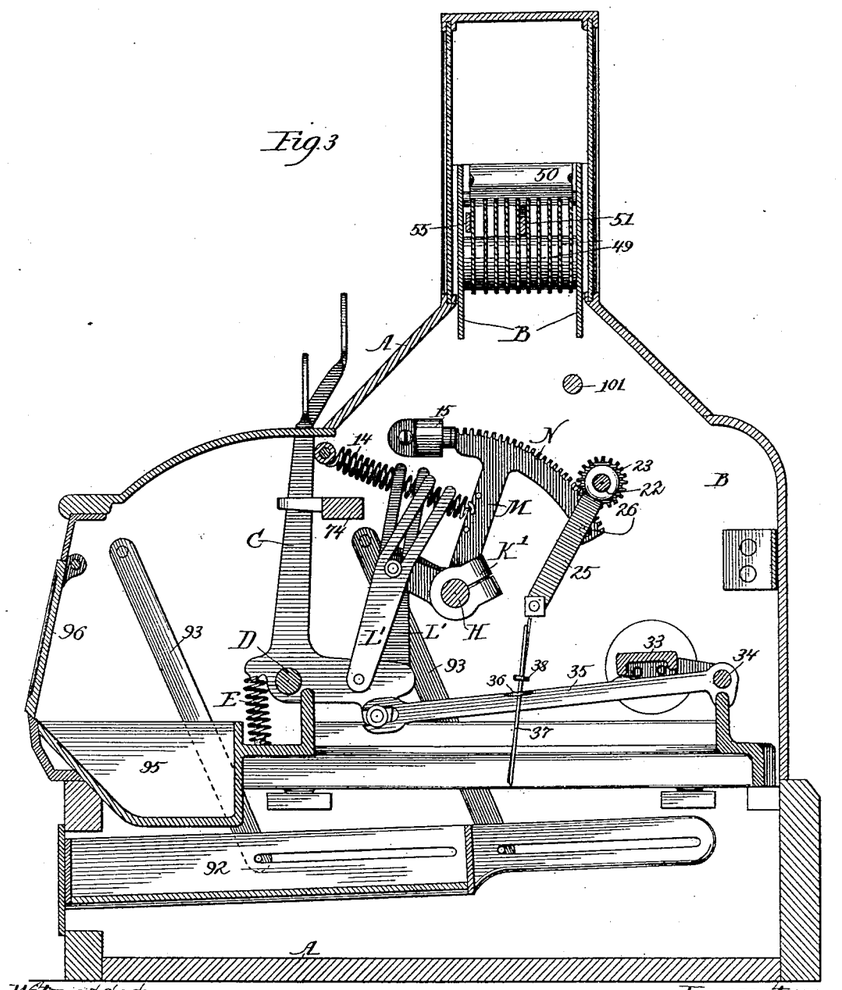
Fig. 3 is a similar section taken at line 3 of Fig. 1, looking to the left.
Figures 4, 5, 6:
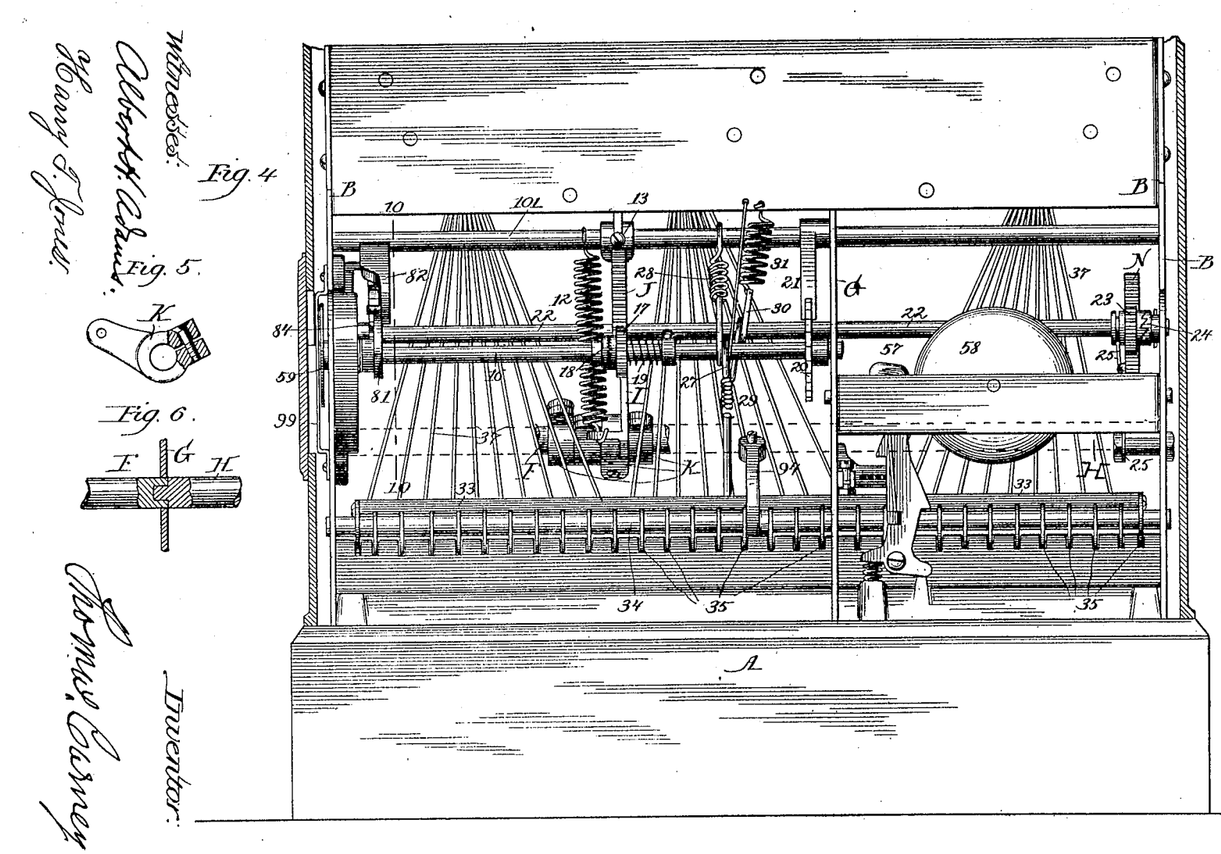
Fig. 4 is a rear view, the upper part of the case being removed and some parts being omitted.
Fig. 5 is a detail, being a side view of one of the clamping-levers used on the main operating-shafts.
Fig. 6 is a detail showing how the inner ends of the main operating-shafts are supported.

H (see Fig. 3) is another shaft, one end of which is supported in one end of the frame and the other end is supported in the end of the shaft F, as shown in Fig. 6.

In Fig. 4 I have shown a small portion of the shaft F in full lines, the remainder of such shaft being shown only in dotted lines to prevent confusion. In this figure I have shown the shaft H only by dotted lines and have not indicated the parts which are located thereon.

It is desirable to have the shafts F and H in exactly the same line, although they rock independently of each other, and this object can be well secured as represented in Fig. 6.

I is a lever, which, as shown, is arranged about midway on the shaft F and is rigidly secured thereto. One end of this lever I extends rearward and is provided with a rack J. The other end extends forward. (See Fig. 2.)

K are a series of short levers, each of which is provided with a hub which is divided on one side and from which two ears extend outward to receive a screw by means of which each lever K can be clamped upon the shaft F. By loosening this screw the lever can be slightly rotated on the shaft F for the purpose of adjustment, and then the screw can be again tightened. One of these levers detached is shown in Fig. 5. There is provided one of these short levers for each of the keys used for cents, except that the lever I takes the place of one of such levers K.

L are a series of levers, each pivoted at its lower end to one of the keys. The upper end of each of these levers L is slotted and engages with a pin on the free end of the proper lever K, except that one of these levers L engages with a pin upon the forward end of the lever I.

M is another lever secured near one end of the shaft H, which lever is provided at its upper end with a rack N. The shaft H is provided with a number of levers K' corresponding with the short levers K—one for each of the dollar-keys—except that the lever M has a forward projection which takes the place of one of the levers K'.

L' are a series of levers similar to the levers L and arranged in the same manner and serving the same purpose.

12 (see Fig. 4) is a spring to return the rack J.

13 is a stop to limit the return movement of such rack.

14 (see Fig. 3) is a spring to return the rack N, and 15 is a stop to limit its return movement.

16 is a shaft, on which there is a pinion 17, which engages with the rack J. This pinion is loose on its shaft and its face is provided with ratchet-teeth, which engage with corresponding teeth on the face of a collar 18, secured to the shaft 16.

19 is a coiled spring on the shaft 16, which allows the pinion 17 to be moved back a little from the collar 18, but holds it in engagement with the collar 18 while the shaft 16 is being rotated.

20 is a toothed wheel fixed upon the shaft 16.

21 is a detent engaged with such wheel 20. This shaft 16 may be called the "cent-shaft," because it is used in registering cents.

22 is another shaft, which may be called the "dollar-shaft," because it is used in registering dollars. On this shaft there is a pinion 23, which has upon one side ratchet-teeth, which engage with a fixed collar 24 on the shaft 22.

25 is a spring supported on a stud, the upper end of which spring enters a groove in the hub of the pinion 23, which pinion is loose on the shaft 22, and when such shaft is rotated this pinion is held in engagement with the collar 24 by the action of the spring 25. On the rack N there is a pin 26, the outer end of which is beveled. This pin is arranged so that when the rack N is returned to the position shown in Fig. 3 the pin will pass behind the spring 25 and force it toward the center of the machine, carrying the pinion 23 away from the toothed collar 24.

27 is a strap around the shaft 16. Each end of this strap is connected with coiled springs 28 29, which springs are also connected with some part of the machine. The object of this strap and these springs 28 29 is to produce a little friction upon the shaft 16 and prevent it from being carried too far when operated. A similar strap 30 and springs 31 32 are used in connection with the shaft 22 for the same purpose.

33 is a sway-bar, which is pivotally supported upon the shaft 34.

35 are levers, one for each of the keys. Each lever is pivoted at its rear end upon the shaft 34, and its forward end is provided with a notch which engages with a pin or roller upon the short arm of the proper key. Each lever 35 is, as shown, provided with an ear 36, upon one side, through each of which ears one of the rods 37 passes. On each rod, as shown, there is a button 38, near the lower end, with which the proper ear engages.

Figures 7, 8, 9:
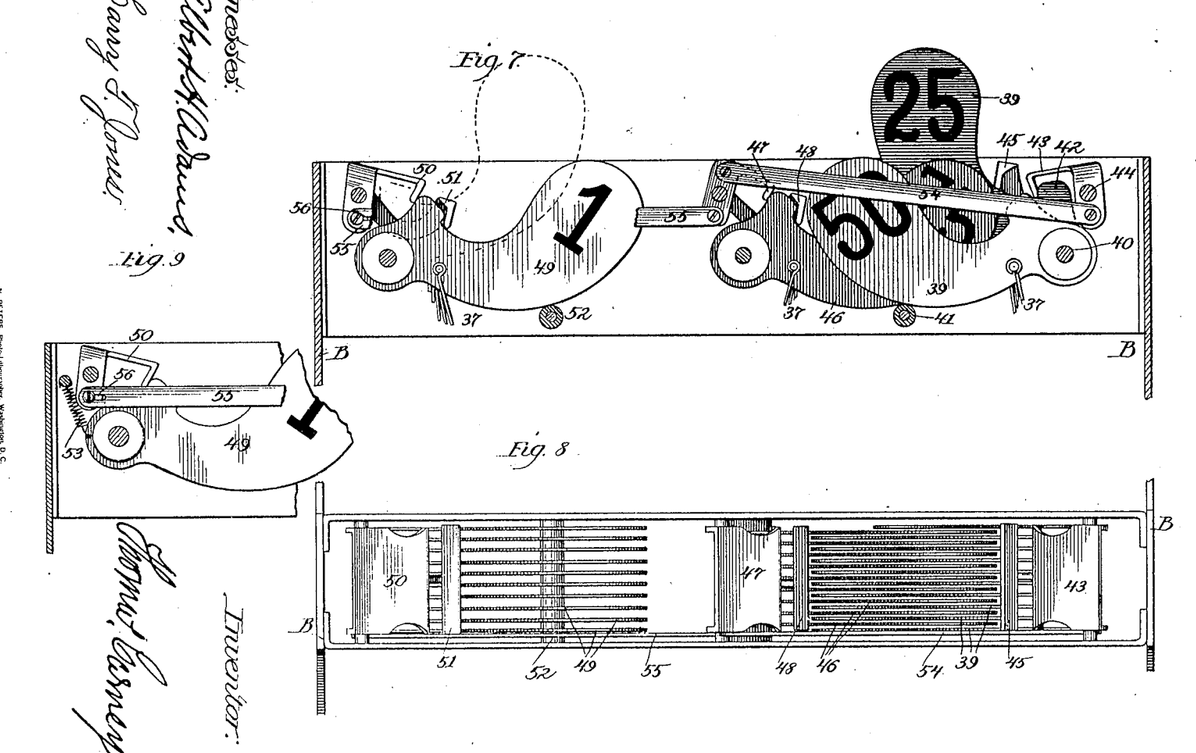
Fig. 7 is a detail, being a front view of the plates which carry the indicating-figures and parts connected therewith, the front of the case being removed.
Fig. 8 is a top view of the plates which carry the indicating-figures and some parts connected therewith.
Fig. 9 is a modification showing a spring instead of a weight to return the indicating-plates to position.

39 represents a series of thin metal plates, which have the form shown in Figs. 7 and 9. Each is pivoted at 40 on a rod supported in the frame. One of each of these plates 39 is provided with a figure or figures corresponding with the figures 5 10 15 20 25 50 55 60 65 70 on the keys. These plates 39, when in their normal position, rest on a rod 41, and each plate is provided with a projection 42 near the heel.

43 is a catch pivoted at 44, and arranged to engage with the projection 42 when the proper plate is in position to expose the figures, as shown by the plate which has the figures 25 in Fig. 7. This catch is arranged to ride over the projection 42, and drop by gravity into the required position to hold the plate exposed.

45 is a pivoted weight arranged to engage with the upper edges of the plates 39 for the purpose of aiding in returning them to their normal position. There is another series of thin metal plates 46, each of which is provided with figures to correspond with figures on the keys 30 35 40 45 75 80 85 90 0. Each of these plates 46 is like the plates 39, and in their normal position they rest on the rod 41. There is provided a pivoted catch 47 and a weight 48 to operate in connection with them, the same as before described. All of these plates 39 and 46, except the 0-plate, are to indicate cents, and with each there is connected a rod 37. There is another series of similar plates 49, with each of which one of the rods 37 is connected, and a catch 50 and weight 51 are used in connection therewith, as before described. These plates 49 are provided with figures from 1 to 10 to indicate dollars, and in their normal position they rest on a rod 52. Instead of using a weight to return these plates to their normal position after they have been elevated, a light spring 53 may be used, as shown in Fig. 9, for this purpose. Each of the pivoted catches is provided with an arm extending down from its pivotal point.

54 is a bar, one end of which is pivoted to the downward extension from the catch 43, and at the other end it is pivoted to the catch 47 above its pivotal point.

55 is another bar, pivoted at one end to the extension below the pivotal point of the catch 47, and at the other end is pivoted to a like extension below the pivotal point of the catch 50. There is a slot 56 at this end of the bar 55.

57 is a striker for the gong 58, which striker is operated by the movement of the sway-bar and other devices, substantially as shown and described in my former patent, granted to me September 4, 1888, No. 388,825.

Figure 11:
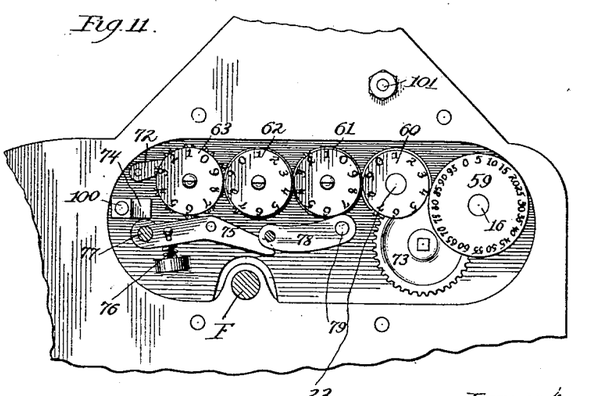
Fig. 11 is an outside view of the registry-wheels, showing also part of the locking devices and a lever which is used when it is desired to rotate the dial-wheels, except the wheel for units, backward, and a gear-wheel, by means of which this can be done.

59 (see Fig. 11) is a registering-disk which registers cents. This disk is on the end of the shaft 16, which projects through the frame.

60 61 62 63 are disks, which are used to register, respectively, units, tens, hundreds, and thousands of dollars. The wheel 60 is on the shaft 22.

64 is a wheel, also on the shaft 22, which wheel has a single tooth 65.

66 is another wheel having ten notches with which the tooth 65 can engage.

67 is another wheel having a single tooth which engages with notches or teeth on the wheel 68.

69 is another wheel having a single tooth which engages with notches or teeth on the wheel 70.

The disk 61 and the wheels 66 and 67 are all on the same short shaft. The disk 62 and the wheels 68 and 69 are on another short shaft. The disk 63 and the wheel 70 are on another short shaft. On the inside of the wheel 70 there is a pin 71, with which a pawl 72 can engage when this wheel 70 moves in one direction.

73 is a gear-wheel, which engages with a pinion $b$ on shaft 22, which pinion is between the disk 60 and the wheel 64. This wheel 73 is used for reversing and is supported on a short shaft, on the outer end of which there is a thumb-piece $a$.

74 is a locking-bar.

75 is a pivoted lever. 76 is a spring acting on this lever, which is arranged to engage with the end of the locking-bar when it has been pushed in and hold it in place. This lever 75 is provided with a knob 77, which is on a pin which projects out from the lever.

78 is a lever secured at 79 to a short shaft, which extends through the frame. This lever is provided with a knob 80, which is on a pin which projects out from the lever, which pin also passes through the lever and is arranged to engage with one end of the lever 75.

81 is a cam on the shaft 16.

82 is a lever pivoted to the frame at 83. The free end of this lever is provided with a pin which rides over the cam 81.

84 is a ratchet-wheel on the shaft 22.

85 is a pawl pivoted to the lever 82 and arranged to engage with the ratchet-wheel 84.

86 is an arm or lever secured to the inner end of the rod or pin 79.

87 and 88 are two pins secured to the arm 86.

89 is a catch pivoted to the frame and arranged to engage with the ratchet-wheel 84 to prevent its backward rotation.

90 is a spring acting on the catch 89.

91 is a spring acting on the lever 82.

92 is a money-drawer designed to receive bills. It is suspended at each end by two parallel bars 93 in such manner that when the drawer is closed it is inclined, as shown in Fig. 3, so that when free to move it will have a tendency to open by gravity. As shown, the drawer is suspended by pins at the lower ends of the parallel bars 93, which pins enter slots in the drawer and in extensions at the rear thereof.

94 (see Fig. 2) is a bent lever pivoted upon the shaft 34, one end of which lever engages with the sway-bar 33, and the other end engages with a catch on the drawer when the same is closed.

95 is a receptacle for coins.

Figure 2:
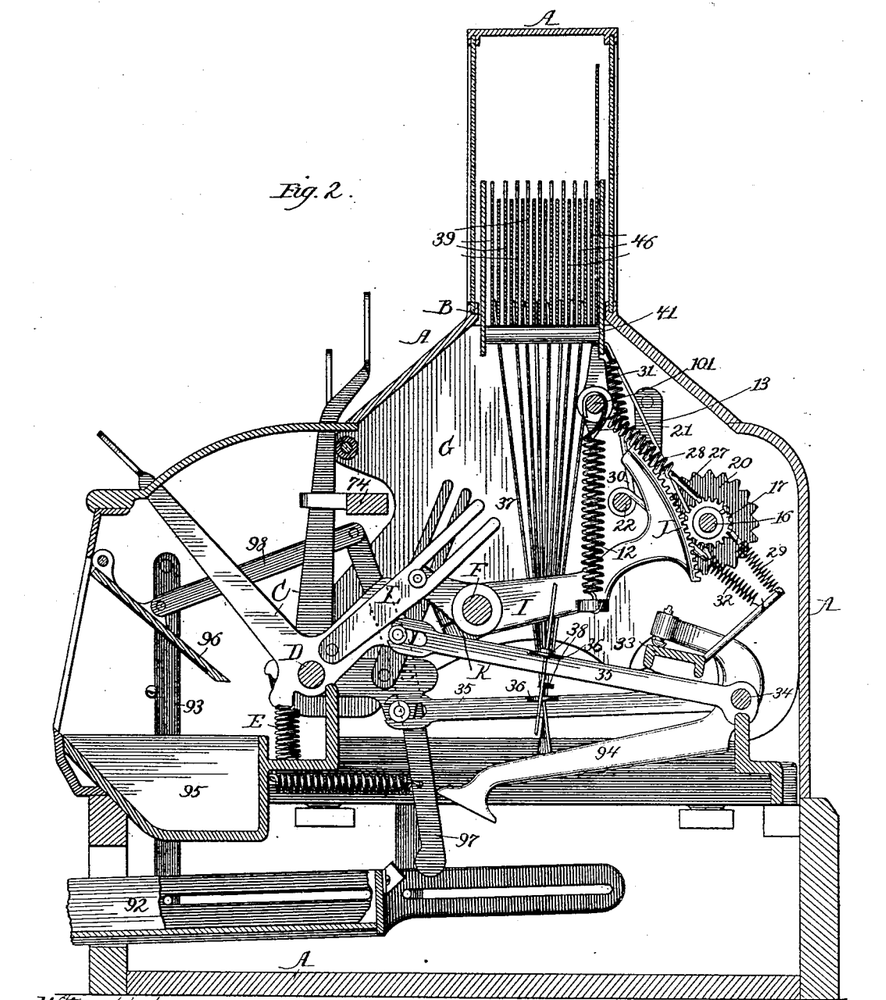
Fig. 2 is a vertical cross-section taken at line 2 of Fig. 1, looking to the left.

96 is a hinged door, which, when closed, as shown in Fig. 3, prevents access to the receptacle 95, and when open, as shown in Fig. 2, permits access thereto.

97 is a lever pivoted near its center, the lower end of which is arranged to engage with the rear end of the drawer 92.

98 is an arm which connects the door 96 with the upper end of the lever 97.

99 is a plate over the registering-disks, but it is provided with holes for the exposure of the proper figures; also, with slots and other holes the purposes of which are apparent. A door covering this plate is to be provided, as shown in my former patent, the key of which can be carried by the proprietor.

100 is an extension at the end of the locking-bar, and such extension projects beyond the case.

The levers L L' are each pivoted to one of the keys. The distance of the pivotal point for a lever L or L' from the pivotal point of the key varies as the distance which the rack J or N is to move, and when the key has been drawn forward as far as it can go—the shaft on which the key is pivoted—the point at which a lever L or L' is pivoted to the key, and the point of engagement of such lever L or L' with the lever which operates the shafts F or H will be nearly in line, as shown in Fig. 2.

101 is a fixed rod supported in the frame.

The operation, so far as not before described, is as follows: The keys are operated by pulling them forward instead of pressing them down. Suppose the twenty-five-cent key be drawn forward. One of the plates 39, which carries the figure 25, will be brought into view, as shown in Fig. 7, which will be done through the proper lever 35, the raising of the forward end of which will elevate the rod 37, which is connected with the said plate, bringing the same into view, and this plate will be held in its raised position by the catch 43, as shown in Fig. 7. At the same time, the proper lever L being in engagement with the pin at the free end of the proper lever K, the free end of such short lever will be lifted and the shaft F will be rocked, and the rack J will be moved downward, and such rack being in engagement with the pinion 17 the shaft 16 and the registering-disk 59 will be moved the proper distance, bringing the proper figure or figures into view. At the same time the sway-bar 33 will be raised by the same lever 35, and at the proper time the gong will be struck, the striking devices being substantially the same as in my former patent. As often as the shaft 16 makes one revolution, the lever 82 will be raised to its highest point by the cam 81, and when the highest point of the cam leaves the pin or roller on the free end of such lever the spring 91 will force such lever down and the pawl 85 will engage with one of the teeth on the ratchet-wheel 84, causing the shaft 22 to move far enough to rotate it and the disk 60 thereon far enough to bring the next figure into view. In other words, with every revolution of the disk used for registering cents the shaft 22 and disk 60 thereon used for registering dollars will be moved one notch. With every revolution of the wheel 60 the wheel 61 will be moved one notch, with every revolution of the wheel 61 the wheel 62 will be moved one notch, and with every revolution of the wheel 62 the wheel 63 will be moved one notch.

The operation of all of the other keys which indicate cents is the same as that just described. When one of the dollar-keys is drawn forward, the proper lever 35 will be operated, as before, and, through the proper lever L', the shaft H will be partially rotated, giving motion to the rack N and partially rotating the shaft 22, through the pinion 23, moving the disk 60 the proper distance.

The springs 12 and 14, respectively, return the shafts F and H to their normal position when the keys are released. When one of the plates carrying figures indicating cents—25, for example—as shown in Fig. 7, has been brought into view, it will remain in that position for the time being. When any one of the other keys for cents is operated, the heel of the plate next to be brought into view will come in contact with the edge of one of the catches 43 or 47, as the case may be, lifting it so as to release the exposed plate; or the exposed plate can be released so that it will return to its normal position by operating the 0-key. All three of the catches 43, 47, and 50 will be simultaneously lifted by the movement of either one of the cent-keys, because when either one of the catches 43 or 47 is raised by either one of the plates 39 or 46 the other catches will be operated through the bars 54 and 55. By reason of the slot 56 in the bar 55 the dollar-keys can be operated without affecting the catches 43 and 47. If there be a sale greater in amount than one or more dollars, the operator should operate the cent-key first and then the dollar-key, because the movement of the dollar-keys does not trip the cent-keys; but the movement of either one of the cent-keys trips all of the figure-plates which may be exposed, whether cents or dollars.

The party using the machine can lock the keys so that they cannot be moved by pushing in the extension 100, which will move the locking-bar so that the hooks thereon (shown in Fig. 12) will engage with the several keys. When this bar is pushed in, the lever 75 will be forced up over the end of the bar by the action of the spring 76, and then the machine cannot be operated until the party carrying the key opens the door and releases the locking-bar by pulling down the lever 75.

Figure 10:
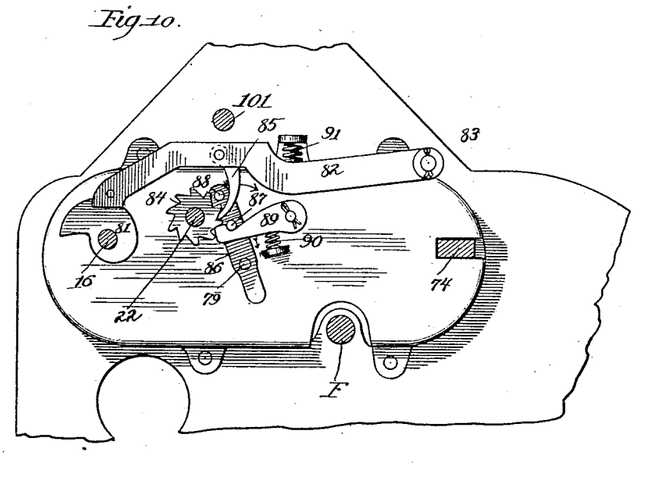
Fig. 10 is a detail, being a section at line 10 of Fig. 4, looking to the left, showing part of the devices by means of which the dial-wheel for tens is operated when it is necessary to carry 1 to the tens-dial.
Figure 12:
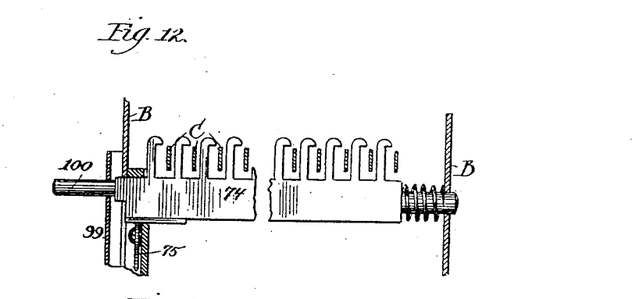
Fig. 12 is a detail, being a plan of the locking-bar, the keys and case being in section.
Figures 13, 14:
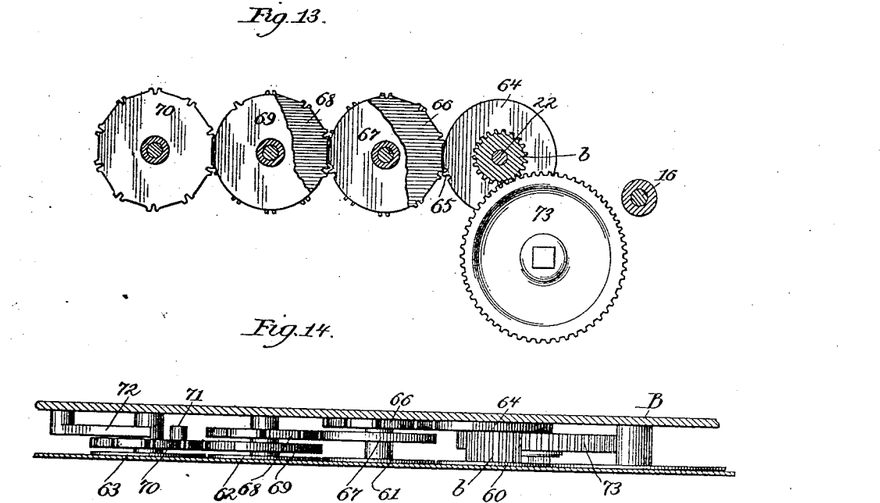
Fig. 13 is a detail, being a front elevation, showing the wheels by which the registry-wheels which indicate dollars are operated; also, a gear-wheel for reversing.
Fig. 14 is a detail, being a sectional plan, showing the registry-wheels and the wheels shown in Fig. 13.
Figure 15:
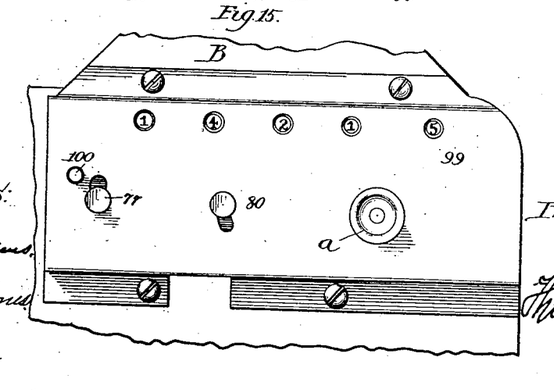
Fig. 15 is a partial end view showing the plate which covers the registering disks or wheels, in which plate there are holes for the exposure of the proper figures and for other purposes, which plate is removed in Fig. 11.

There is a spring shown in Fig. 12 which returns the locking-bar to its normal position when the lever 75 has been released. All of the registering-disks can be readily set so as to indicate nothing. This can be done by operating the proper keys until the cipher on the cent-wheel 59 appears in view. Then by pushing in the locking-bar the right-hand end of the lever 75 will be thrown down and then the free end of the lever 78 can be thrown down, which will move the upper end of the lever or arm 86 toward the right, (looking at Fig. 10,) and the pin 87 will force the catch 89 down out of engagement with the ratchet-wheel 84, and the pin 88 will engage with the pawl 85 and carry it away from such ratchet-wheel 84, leaving it free to be rotated backward; then, the parts being still held in this position, the wheel 73 can be rotated in the direction indicated by the arrow in Fig. 11 by means of the thumb-piece connected with such wheel 73, which will cause all of the disks 60 61 62 63 to be rotated backward. When the lever 75 is in the position shown in Fig. 11, the lever 78 cannot be forced down.

When the shaft 22 is to be rotated backward for the purpose of reversing the dial-wheels, the pinion 23 must be disengaged from the collar 24, and this is accomplished by the pin 26 on the rack N, which pin, when the rack returns to its normal position, engages with the spring 25 and forces it and the pinion 23 away from the collar 24.

What I claim as new, and desire to secure by Letters Patent, is as follows:

1. The combination, with key-levers, a rock-shaft F, registering-disks, and mechanism connecting the rock-shaft with the registering-disks, of short levers K, adjustably-clamped on the rock-shaft, and connections between the key-levers and the adjustably-clamped short levers, substantially as described.

2. In a registering and indicating machine, a series of keys pivoted upon a shaft, in combination with a slotted case, a series of levers, such as L and L', shafts F and H, two sets of short levers K K', arranged, respectively, on the shafts, registering-disks, and connections between the registering-disks and the shafts, substantially as and for the purpose specified.

3. In a registering and indicating machine, a series of keys pivoted on a shaft, in combination with a series of levers L L', levers K, shaft F, lever I, carrying a rack J, and shaft 16, carrying a pinion 17, substantially as and for the purpose specified.

4. In a registering and indicating machine, a series of keys pivoted upon a shaft, in combination with a series of levers 35, levers L L', shafts F and H, lever I, carrying a rack J, shaft 16, carrying pinion 17, lever M, carrying a rack N, and shaft 22, carrying a pinion 23, substantially as and for the purpose specified.

5. In a registering and indicating machine, a rock-shaft H, in combination with a lever M, carrying a rack N, shaft 22, carrying a pinion 23, having a grooved hub and provided with ratchet-teeth upon one side, collar 24, provided with ratchet-teeth upon one side, and a spring 25, substantially as and for the purpose specified.

6. In a registering and indicating machine, a rock-shaft F, in combination with a lever I, carrying a rack J, shaft 16, pinion 17, provided with ratchet-teeth upon one side, collar 18, provided with ratchet-teeth upon one side, and spring 19 on the shaft carrying the pinion, substantially as and for the purposes specified.

7. In a registering and indicating machine, the combination, with a shaft D and a series of keys C thereon, of the shaft 34, a series of levers 35, pivoted at their rear extremities on the latter, having their front ends connected with the key-levers, and between their extremities provided with ears 36, a series of pivoted plates, such as 39 and 46, and rods 37, extending from the pivoted plates, passing through the said ears and having buttons 38, substantially as described.

8. In a registering and indicating machine, a series of plates, such as 39 and 46, pivoted in the frame, each provided at the edge above its pivot with a projection 42, in combination with the swinging latches located above the plates on independent pivots, and adapted to engage with the projections 42 on said plates, substantially as and for the purpose specified.

9. In a registering and indicating machine, a series of plates, such as 39, 46, and 49, pivoted in the frame, each plate being provided at the edge above its pivot with a projection, such as 42, in combination with swinging latches located above the plates on independent pivots and adapted to engage with such projections, and bars 54 and 55, connected with the latches, substantially as and for the purposes specified.

10. In a registering and indicating machine, a series of plates, such as 39 and 46, each plate being provided at the edge above its pivot with a projection 42, in combination with swinging latches located above the plates on independent pivots, and adapted to engage with said projections, and weights or springs for the purpose of aiding in returning the plates to their normal position, substantially as specified.

11. In a registering and indicating machine, the combination of swinging key-levers C, the shaft 16, carrying at its outer end the registering-disk 59 and provided with the cam 81, connections between the key-levers and the said shaft to rotate the latter, a shaft 22, carrying at its outer end the registering-disk 60 and provided with the ratchet-wheel 84, a lever 82, pivoted at one extremity, extending over both of said disk-carrying shafts acted on by the cam and provided with the pendent pawl 85, and a spring 91 for throwing the pawl-lever downward, substantially as described.

12. In a registering and indicating machine, the combination of a series of pivoted swinging key-levers C, registering-wheels, connections between the key-levers and the wheels, a spring pressed lengthwise, sliding lock-bar for the swinging key-levers for holding them against swinging movement, and a spring-pressed lever 75, which engages the lock-bar after the latter is pressed inward, substantially as described.

13. In a registering and indicating machine, the combination of a rocking-shaft F, a second rocking-shaft H, supported at one end in the latter, levers on the shafts, key-levers, registering-disks, and connections between the registering-disks and the shafts, substantially as described.

14. In a registering and indicating machine, a sliding drawer suspended by parallel bars, in combination with a device for holding the said drawer in its closed position, keys for operating the indicating mechanism, and connections between such keys and the drawer-holding device for releasing the same when a key is operated, substantially as specified.

15. In a registering and indicating machine, the shaft 22, rack N, pinion 23, and collar 24, in combination with a spring 25, and pin 26 on the rack N, to force the pinion 23 away from the collar 24, substantially as specified.

16. In a registering and indicating machine, the lever 86, provided with two pins 87 and 88, in combination with the pawl 85, catch 89, and lever 78, substantially as and for the purposes specified.

THOMAS CARNEY.

Witnesses:
ALBERT H. ADAMS,
HARRY T. JONES.